(12) United States Patent
Baharav et al.

(10) Patent No.: US 9,020,110 B1
(45) Date of Patent: Apr. 28, 2015

(54) CONSUMER-PROVIDER VIDEO INTERACTION

(76) Inventors: Ofer Baharav, Palo Alto, CA (US); Carl Jackson, Palo Alto, CA (US)

( * ) Notice: Subject to any disclaimer, the term of this patent is extended or adjusted under 35 U.S.C. 154(b) by 158 days.

(21) Appl. No.: 13/555,035

(22) Filed: Jul. 20, 2012

Related U.S. Application Data

(60) Provisional application No. 61/639,054, filed on Apr. 26, 2012, provisional application No. 61/510,053, filed on Jul. 20, 2011.

(51) Int. Cl.
*H04M 11/00* (2006.01)
*H04M 15/00* (2006.01)

(52) U.S. Cl.
CPC ...................................... *H04M 15/70* (2013.01)

(58) Field of Classification Search
USPC .............. 379/93.12, 93.17; 348/14.01, 14.08, 348/14.02
See application file for complete search history.

(56) References Cited

U.S. PATENT DOCUMENTS

| 7,966,325 | B2* | 6/2011 | Singh | 707/732 |
|---|---|---|---|---|
| 8,566,425 | B1* | 10/2013 | Srinivasaiah | 709/219 |
| 2002/0029350 | A1* | 3/2002 | Cooper et al. | 713/200 |
| 2011/0238763 | A1* | 9/2011 | Shin et al. | 709/206 |
| 2012/0197757 | A1* | 8/2012 | Ajala | 705/26.9 |
| 2012/0320145 | A1* | 12/2012 | Kahn | 348/14.08 |
| 2013/0232130 | A1* | 9/2013 | Jellum | 707/706 |

* cited by examiner

*Primary Examiner* — Olisa Anwah
(74) *Attorney, Agent, or Firm* — Shvarts & Leiz LLP

(57) ABSTRACT

Methods, systems, and computer-readable media are provided for interactions between a consumer and a service provider. In some embodiments, an interaction application may provide a collection of service providers to a consumer, receive a selection of a service provider from the consumer, and establish a two-way video communication between the consumer and the service provider. In some embodiments, the interaction application may charge a fee to the consumer, the service provider, or both, for the providing the interaction.

17 Claims, 9 Drawing Sheets

CONSUMER-PROVIDER VIDEO INTERACTION

This application claims the benefit of U.S. Provisional Application No. 60/639,054, filed Apr. 26, 2012, and U.S. Provisional Application No. 60/510,053, filed Jul. 20, 2011, both of which are hereby incorporated by reference in their entireties.

The present disclosure relates to systems and methods for conducting interactions, and more particularly, to establishing a peer-to-peer marketplace for services using video chat on a user device.

SUMMARY

Methods, systems, and computer-readable media are provided for providing interaction between a consumer and a service provider.

In some embodiments, an interaction application may receive from a first user device associated with the consumer, one or more criteria for selecting the service provider. The interaction application may provide to the first user device associated with the consumer, a collection of service providers based at least in part on the criteria. The interaction application may receive from the first user device associated with the consumer, a selection identifying a service provider from the collection of service providers. The interaction application may establish a video connection between the first user device associated with the consumer and a second user device associated the service provider. The interaction application may maintain a balance amount at least a part of which is to be paid to the service provider.

BRIEF DESCRIPTION OF THE FIGURES

The above and other features of the present disclosure, its nature and various advantages will be more apparent upon consideration of the following detailed description, taken in conjunction with the accompanying drawings in which.

DETAILED DESCRIPTION OF THE FIGURES

The present disclosure is directed towards methods and systems for conducting interactions using camera-enabled user devices. For example, a camera-enabled user device may include smartphones like the Apple iPhone, a tablet such as the Apple iPad, or a laptop computer with a camera. In some embodiments, a front facing camera (i.e., on the same side of the device as the display screen) may be used to enable 2-way video communication, herein referred to as "video chat." It will be understood that in some embodiments, communication may include voice communication, communication of still photographs, communication of pre-recorded video, 1-way video chat (e.g., a first user with video and audio capabilities and a second user with audio capabilities only), text message communication, any other suitable communication technique, or any combination thereof. The interaction application for conducting interactions may enable a marketplace for selling and buying user-generated services. For example, the interaction application may enable virtual tutoring, language lessons, musical instrument lessons, academic lessons, consulting, any other suitable service, or any combination thereof. The term "virtual," as used herein, will refer to communication that does not require a physical presence. In some embodiments, the communication may be one-to-one, many-to-one, one-to-many, or many-to-many, any other suitable arrangement, or any combination thereof.

The interaction application may enable users to be both consumers and providers of content. As used herein, the term "consumer" shall refer to a user receiving, ordering, requesting, purchasing, or otherwise using a service. As used herein, the term "provider" shall refer to a user offering, delivering, or producing content or services that will be received by a consumer. It will be understood that an entity may be a consumer, a provider, or both a consumer and a provider.

The features of the present disclosure are described herein in terms of an interaction application. The interaction application may be any suitable software, hardware, or both for implementing or otherwise providing the features described herein. The interaction application may be implemented in a single device, such as in a user device or in a network-based server. The interaction application may be implemented across multiple devices as part of a distributed system of devices such as user devices and computers/servers communicatively coupled thereto.

The following description and accompanying FIGS. 1-9 provide additional details and features of some embodiments of the interaction application and its underlying system.

Figure 1:
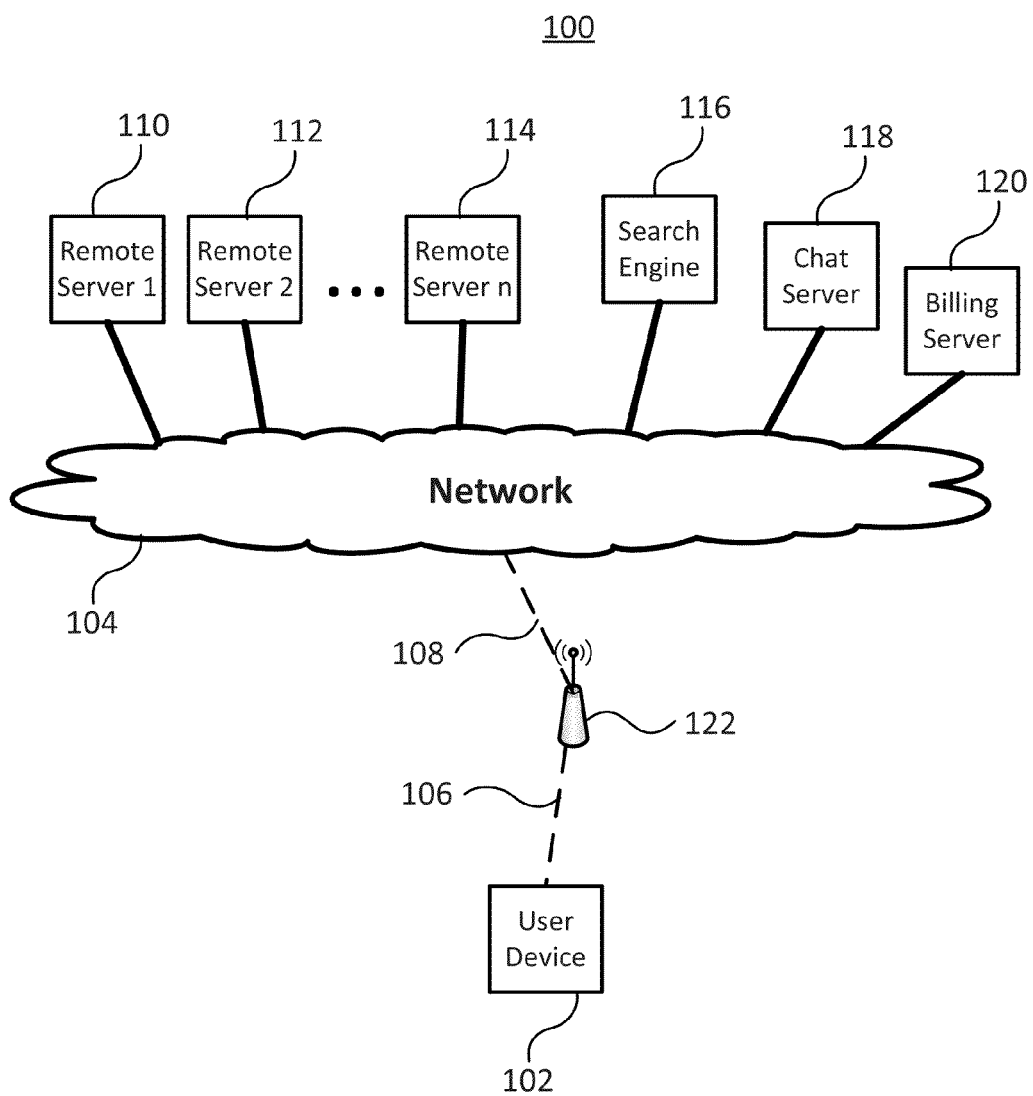
FIG. 1 shows an illustrative system for implementing a communication system in accordance with some embodiments of the present disclosure.

FIG. 1 shows an illustrative system for implementing a communication system in accordance with some embodiments of the present disclosure. System 100 may include one or more user devices 102, network 104, one or more remote servers 110, 112, and 114, search engine 116, chat server 118, and billing server 120. User device 102 may include a smartphone, tablet computer, mobile gaming device, laptop computer, desktop computer, cellular phone, any other suitable user device, or any combination thereof. User device 102 may be coupled to network 104 by connection 106, communication device 122, and connection 108. Communication device 122 may include one or more cellular phone towers, RF repeaters, satellites, routers, switches, any other suitable communication device, or any combination thereof. Connection 106 and connection 108 may use a mobile communication protocol, other RF communication protocols, Ethernet protocols, other hardwired communication protocols, any other suitable technique, or any combination thereof. Communication protocols and standards may include, for example, GSM, CDMA, 3G, 4G, 4G LTE, WiMax, WiFi, other suitable standards under IEEE 802, any other suitable protocol, or any combination thereof. For example, system 100 may include a smartphone coupled to a network by a 4G GSM network. In another example, system 100 may include a table computer coupled to a network by an 802.11 WiFi wireless Ethernet connection. It will be understood that the arrangement of connection 106, communication device 122, and connection 108 is merely illustrative and any suitable number and arrangement of connections and communication devices may be used to couple one or more user device 102 to network 104.

Network 104 may include the Internet, a private intranet, any other suitable network of coupled computing systems, or any combination thereof. Any suitable number of remote processing servers, remote storage servers, or any combination thereof, may be coupled to network 104, including remote server "1" 110, remote server "2" 112, up to remote server "n" 114. A server may be any suitable software, hardware, or both implemented in one or more computing devices for performing particular functions in a network environment. One or more search engine servers 116, configured to search an index or database, may be coupled to network 104. One or more chat servers 118, configured to enable chat communication using video, audio, text, or any thereof, may be coupled to network 104. One or more billing servers 120, configured to process billing and payments, may be coupled to network 104. It will be understood that any suitable number of any types of servers (i.e., general purpose or specific) may be used by the interaction application to carry out processing steps. Any processing steps may be carried out at least in part by user device 102, at least in part by the servers coupled to network 104, at least in part by any other suitable processing equipment, or any combination thereof.

Figure 2:
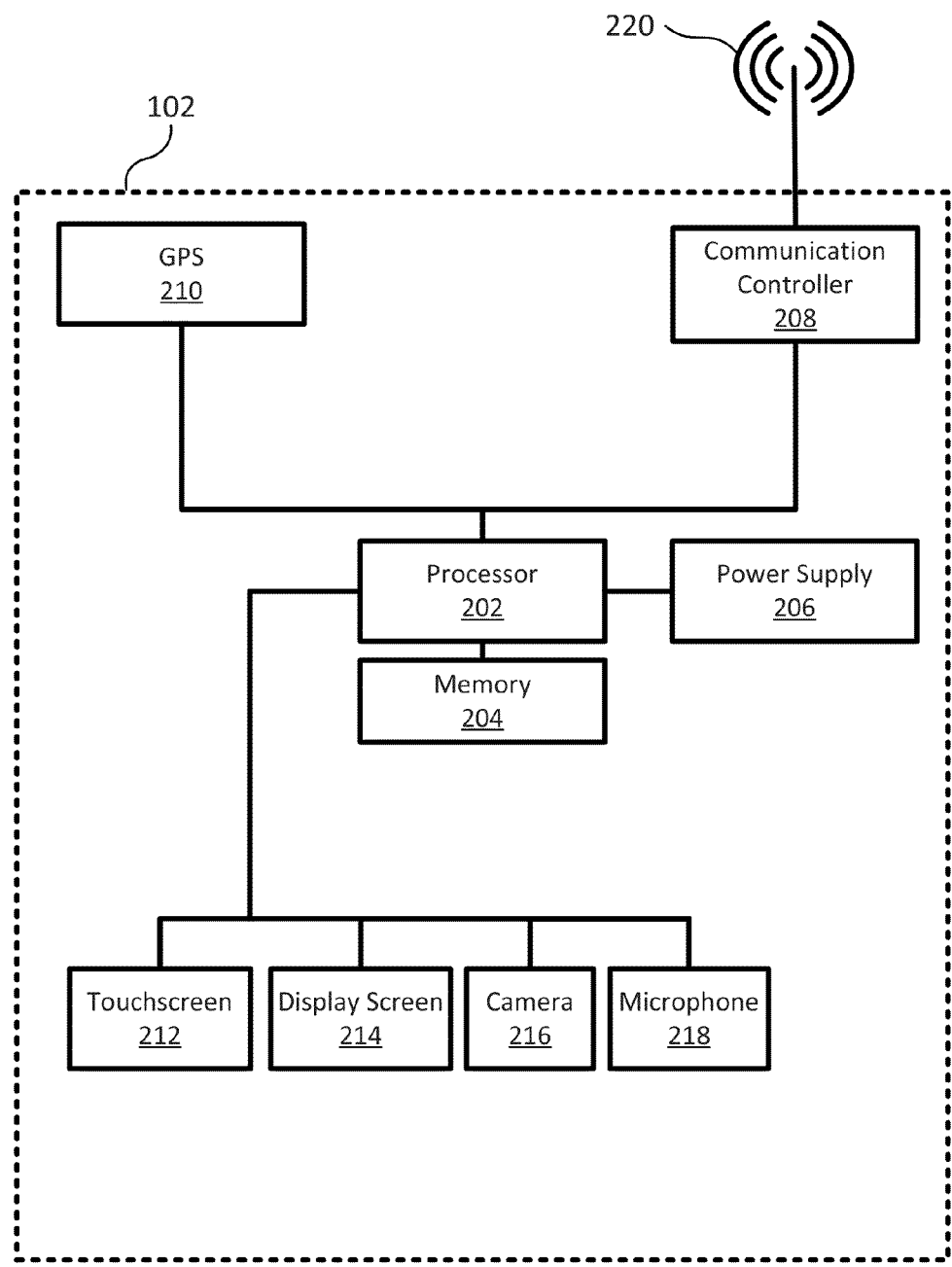
FIG. 2 is a block diagram of a user device in accordance with some embodiments of the present disclosure.

FIG. 2 is a block diagram of a user device in accordance with some embodiments of the present disclosure. User device 102 may include one or more processors 202 capable of processing computer instructions, configured with one or more inputs and one or more outputs. Memory 204 may be coupled to processor 202. Memory 204 may include RAM, ROM, EPROM, EEPROM, FPGA, CD-ROM, DVD, Hard Disk Drive, Flash Memory, any suitable volatile or non-volatile memory, or any combination thereof. Power supply 206 may be coupled to processor 202, and may be coupled to any other suitable elements of user device 102. Power supply 206 may include a battery (e.g., Li-Ion), wall outlet converter, regulators, transformers, any other suitable equipment, or any combination thereof.

User device 102 may include touchscreen 212, display screen 214, camera 216, microphone 218, other suitable input/output equipment (not shown), or any combination thereof. Touchscreen 212 may include a touch sensitive area, configured to receive input based on pressure, capacitance, any other suitable input, or any combination thereof. Display screen 214 may include an LED, LCD, AMOLED, PLED, any other suitable display technique, or any combination thereof, capable of displaying content to a user. In some embodiments, touchscreen 212 and display screen 214 may be aligned such that user device 102 may receive input indicating a particular area of the display screen by receiving a press or touch at that location on the touchscreen. User device 102 may include camera 216, configured to receiving visual input including video and still pictures. User device 102 may include microphone 218 configured to receive audio input.

User device 102 may include GPS receiver 210. GPS receiver 210 may include one or more antennas (not shown). GPS receiver 210 may be configured to receive communication signals from one or more satellites including information about the time, location, and orbit of the one or more satellites. In some embodiments, the GPS receive may use the information from the one or more satellites to determine the geographic location of user device 102 on the surface of the earth. In some embodiments, other information may be used in place of or in combination with the satellite signals to determine the location of user device 102, for example, signals from nearby RF communications.

In some embodiments, user device 102 may include communication controller 208. Communication controller 208 may be configured to send and receive communication signals. In some embodiments, communication controller 208 may include a modem, a radio, other suitable equipment, or any combination thereof. Communication controller 208 may be coupled to antenna 220.

Figure 3:
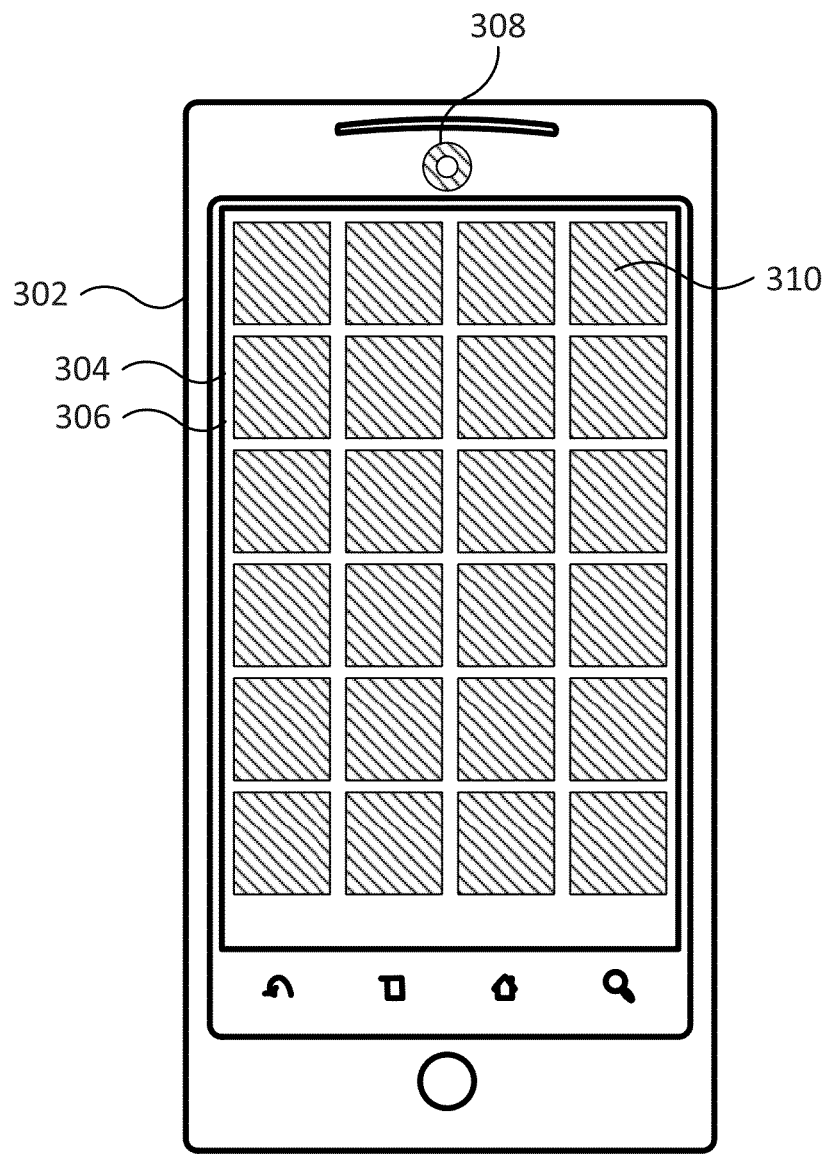
FIG. 3 shows an illustrative mosaic display on a user device in accordance with some embodiments of the present disclosure.

FIG. 3 shows an illustrative mosaic display on a user device in accordance with some embodiments of the present disclosure. User device 302 may include a smartphone (as shown), a tablet, a laptop computer, a desktop computer, any other suitable communication device, or any combination thereof. User device 302 may include display screen 304, touchscreen 306, and camera 308. In some embodiments, display screen 304 and touchscreen 306 may be aligned such that user device 304 may receive an touch input using touchscreen 306 in substantially the same location as a desired object is displayed on display screen 304.

In some embodiments, the interaction application may display identifiers related to one or more providers on display screen 304 of user device 302. The mosaic may include an array of identifiers arranged in a grid (as shown), in a list, in any other suitable arrangement, or any combination thereof. It will be understood that the 4-by-6 grid of identifiers shown in FIG. 3 is merely exemplary and the interaction application may use any suitable arrangement. For example, identifier 310 may relate to a first provider, while other portions of the grid of identifiers may relate to other providers. In some embodiments, the identifiers may include an image, text, video, other suitable content, or any combination thereof. In some embodiments, the may include a picture of the provider. In some embodiments, the identifiers may relate to a user profile of a provider. In some embodiments, the identifier may include an image or other content indicative of the service provided. For example, the interaction application may display an image of a leaky pipe as the identifier for a plumber.

Figure 4:
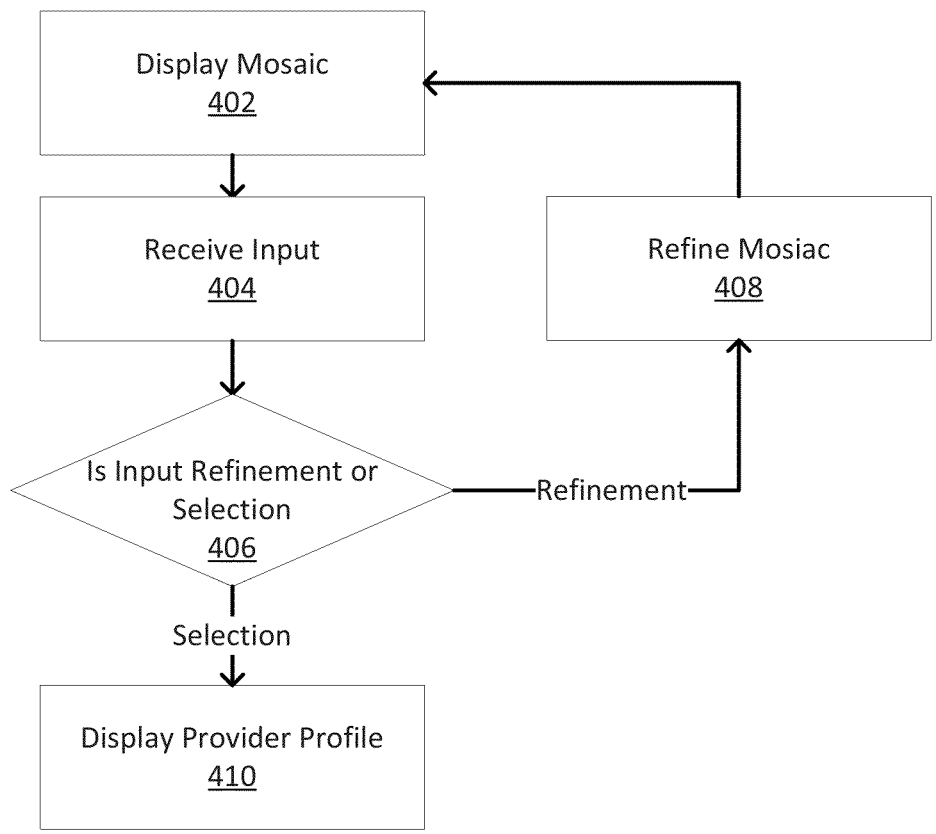
FIG. 4 is a flow diagram showing illustrative steps for implementing a mosaic display feature in accordance with some embodiments of the present disclosure.

FIG. 4 is flow diagram 400 showing illustrative steps for implementing a mosaic display feature in accordance with some embodiments of the present disclosure.

In step 402, the interaction application may display a mosaic. As described above, the mosaic may include one or more identifiers related to a set of providers. Step 402 may include an initial search or other identification of desired providers before displaying the mosaic. The displayed providers may be determined based in part on, for example, geographic location and services provided. The interaction application may display the one or more identifiers such that it may receive input from a user related to a selected identifier using, for example, touchscreen 212 of FIG. 2. In some embodiments, the order of identifiers displayed in the mosaic may be sorted by the relevance of the provider, by the geographic location of the provider, by the name of the provider, by any other suitable criteria, or any combination thereof.

In some embodiments, step 402 may include location based services (LBS), otherwise referred to as geolocation. Location based services may use, for example, global positioning system (GPS) receiver 210 of FIG. 2, configured to receive signals from one or more global positioning satellites. The interaction application may use location based services to provide a user with connections in a marketplace that are geographically nearby. In some examples of the interaction application using location based services, the virtual communication may be used to arrange a physical interaction. For example, if the interaction application receives a request for a plumber, the interaction application may provide connections to plumbers within a certain geographic radius. In some embodiments, the interaction application may receive input that location based services are not desired. For example, the interaction application may receive a request for virtual language translation services, where the location of the provide is not relevant (or may benefit from being located in another region or country).

In some embodiments, the interaction application may use location based services (LBS) to order or rank identifiers of a mosaic based in part on the distance between the user and the providers identified in the mosaic. For example, the interaction application may display the closest provider highest in the list and the furthest away the lowest. In some embodiments, the interaction application may only display providers with location parameters that meet a particular criterion. For example, the search system may only display providers within 100 miles of the user. In some embodiments, location based services may be determined in part based on user preferences, the availability of location information, the type of service desired, any other suitable parameters, or any combination thereof. For example, the location of a provider may be important to the user for identifying a plumber or doctor, while the location of a language tutor, or other provider where all interactions may be virtual, is less important to the user.

In some embodiments, the interaction application may provide a set of providers based on their location. For example, the interaction application may receive from a user a specified location, range of locations, list of locations, any other suitable specification, or any combination thereof. For example, the search system may receive a request for a computer programmer in San Francisco, Calif. In a further example, the search system may receive a request for pediatricians within 25 miles of Los Angeles. In this embodiment, the interaction application may receive a specified location from the user that is different from the user's current location.

In some embodiments, the interaction application may notify the user when another user with parameters meeting a particular criterion is within a certain proximity. The other users may not know the user, but may, for example, share some traits or mutual friends. The interaction application may combine several criteria to determine whether a notification is generated. For example, criteria may include proximity, mutual friends, mutual likes or interests, a number of mutual friends, any other suitable parameters, or any combination thereof. In some embodiments, the degree of shared parameters may determine the type of notification. For example, the interaction application may generate a push notification or other notification where an alert is displayed in a predetermined area of a display screen, regardless of the current state of a user device. In another example, the interaction application may generate a notification within the application, for example, on a particular notification page. For example, a first user may be driving through a city and receive a push notification that another user, unknown to the first user but with mutual friends and interest, is nearby. In some embodiments, the notification may include information about the other user, information about why the notification was generated, other suitable information, or any combination thereof.

In some embodiments, step 402 may include the interaction application performing a unilateral vendor search based on public information, private information, or a third-party database. In addition to the interaction application searching active users for a provider, the interaction application may search for providers outside of the interaction application. For example, the interaction application may return results from a search of a social media site, such as LinkedIn or Facebook, where potential, but not enrolled, providers may have user profiles or other information displayed. In some embodiments, the interaction application may contact the potential providers and inform them that a consumer on the interaction application is seeking their services. In some embodiments, the interaction application may contact potential providers using an automatically generated email, SMS, voice message, chat message, any other suitable message technique, or any combination thereof. In some embodiments, the interaction application may use a messaging service associated with a third-party database, for example, Facebook Message to contact a provider identified on Facebook. The interaction application may inform the potential providers of the price structure, ability to earn revenue, other suitable information, or any combination thereof. In some embodiments, the interaction application may search a database that a particular user may have access to (e.g., corporate intranet, university directory).

In some embodiments, the interaction application may include unactivated accounts for users based on information external to the interaction application. The unactivated accounts may include contact, expertise, and other information for a particular user. Unactivated user accounts may be based in part on social media profiles (LinkedIn and Facebook), university webpages, publicly available databases, referrals from other site users, manually entered information, social media connects of users within the interaction application, any other suitable information, or any combination thereof. In some embodiments, the interaction application may receive a contact and/or booking request for an unactivated account, and send both the request notification and an invitation to join the interaction application to the person associated with the unactivated account. For example, a user may search for a particular subject expert and identify an unactivated user account matching desired criteria. The user may request that the person associated with the unactivated account be contacted. The person may receive the request, join the interaction application, and confirm a booking with the user.

In some embodiments, step 402 may include the interaction application connecting users (e.g., consumers and providers, consumers and consumers, providers and providers) by matching criteria set by the user. The interaction application may use keywords, location based services, other suitable information, or any combination thereof, to connect users. In some embodiments, the interaction application may alert the user whenever a provider meeting the criteria is within a particular geographic range or location. For example, a user may predefine criteria that they are seeking providers who speak a particular language. The interaction application may alert the user if a provider who speaks that language is within 1000 feet of them. In another example, the interaction application may alert a consumer if another consumer is within a certain geographic distance or location who meets certain criteria. For example, the consumer may desire to take foreign language lessons with a partner, and so the interaction application may facilitate the two consumers meeting, and then facilitate communication with a suitable provider.

In some embodiments, step 402 may include criteria based on time and date. For example, the interaction application may receive search criteria from a user indicating a desire for service providers available for immediate communication. The interaction application may a search from a consumer searching for service at a particular time, date, or time and date. The interaction application may provide a mosaic of providers meeting the time-based search criteria, and display information about the service available from those providers. In some embodiments, the interaction application may receive a search from a consumer searching for a particular service. The interaction application may return a mosaic of providers meeting the service criteria and display information about the times the service is available from those providers. In some embodiments, video conferencing sessions may be scheduled between a consumer and service provider to take place at a future time.

In some embodiments, search may be keyword based, such that keywords associated with user profiles are matched with keywords included in a received search query. In some embodiments, search may include natural language search, voice based search, image based search, any other suitable advanced searching technique, or any combination thereof. Natural language search may include language parsing to identify parts of speech, word meaning, search intent, root words, modifiers, any other suitable elements, or any combination thereof. For example, the search system may receive the search "I am looking for a CTO programmer with 20 years startup and midsized companies in Silicon Valley that specialized in Ruby on Rails." A natural language search parser may partition the search into shorter blocks, may recognize that "I am looking for" is request rather than content-specific, may recognize that "Ruby on Rails" is a single element referring to a software programming language, may identify root words and their modifiers, may perform any other suitable processing based on the received search query to identify relevant search results, or any combination thereof. In some embodiments, the interaction application may receive a voice search and perform natural language search processing on the transcribed voice input. In some embodiments, voice search may fully or partially include an external application, for example an operating system voice search application such as Apple's SIRI. In some embodiments, the interaction application may use image based search processing. For example, a photograph of a toilet may be recognized by the application as a toilet, and the interaction application may then search for a plumber.

In step 404, the interaction application may receive input from a user using, for example, touchscreen 212 of FIG. 2. The interaction application may receive input indicating a desired refinement of the set of providers displayed in the mosaic, in which case the interaction application may continue to step 408. The interaction application may receive an input indicating input may be a selection of a provider from the mosaic, in which case the interaction application may continue to step 310.

In step 408, the interaction application receive input indicated a desired refinement of the mosaic. In some embodiments, the interaction application may provide the capability for the consumer to search the mosaic. The interaction application may include searchable metadata for the providers displayed in the mosaic. The interaction application may receive input from the consumer indicating an element of that metadata that they would like included in the search. For example, the interaction application may receive information from the user indicating that they would like to see providers offering language translation services. The interaction application may then search the metadata, the user profiles, the provider description, any other suitable content, or any combination thereof, to identify providers that match the desired search. The interaction application may receive input using a keyboard, voice command, any other suitable input, or any combination thereof. The interaction application may then return to step 402, including more providers in the mosaic matching the refinement and less providers in the mosaic that do not match the refinement.

In some embodiments, metadata and other content used to search the providers may be provided by the user, may be determined automatically from content provided, for example, on a user profile, by any other suitable technique, or any combination thereof. The interaction application may automatically determine searchable content by a heuristic algorithm, pattern matching, any other suitable indexing method, or any combination thereof. The interaction application may receive searchable content by receiving input on a form. The form may include sections including location, language, age, specialty, experience, any other suitable criteria, or any combination thereof. In some embodiments, the interaction application may provide predefined terms that can be selected with, for example, a check box. In some embodiments, the form may receive textual input.

In step 410, the interaction application may display the provider profile of a provider selected from the mosaic. In some embodiments, the interaction application may receive a selection by receiving an input to a touchscreen in substantially the same location as the identifier is displayed, by activation of a mouse, trackpad, trackball, or other input device, by any other suitable input, or any combination thereof. Displaying the provider profile may include displaying contact information related to the selected provider, displaying information related to the services offered by the selected provider, starting a video chat with the selected provider, providing any other suitable content, or any combination thereof.

In some embodiments, the provider profile may contain information obtained from third party sources. For example, a provider may establish a profile page on the interaction application in part by providing access for the application to the provider's information on another social media website. The interaction application may import information or elements from the third party website and display them to the user on the profile page, in the mosaic, in any other suitable location, or any combination thereof. The interaction application may, for example, import interests, friends, pictures, movies, audio, descriptions, recommendations, ratings, skill set lists, resumes, any other suitable information, or any combination thereof. The interaction application may use imported information to identify providers and to refine lists of search results, for example, as described in step 408 above. Though FIG. 4 is shown in the context of a mosaic display, it will be understood that the features and functionality described with respect to FIG. 4 may be applied to non-mosaic interfaces as well. For example, unilateral provider searches may be performed to provide a non-mosaic list of relevant providers.

Figure 5:
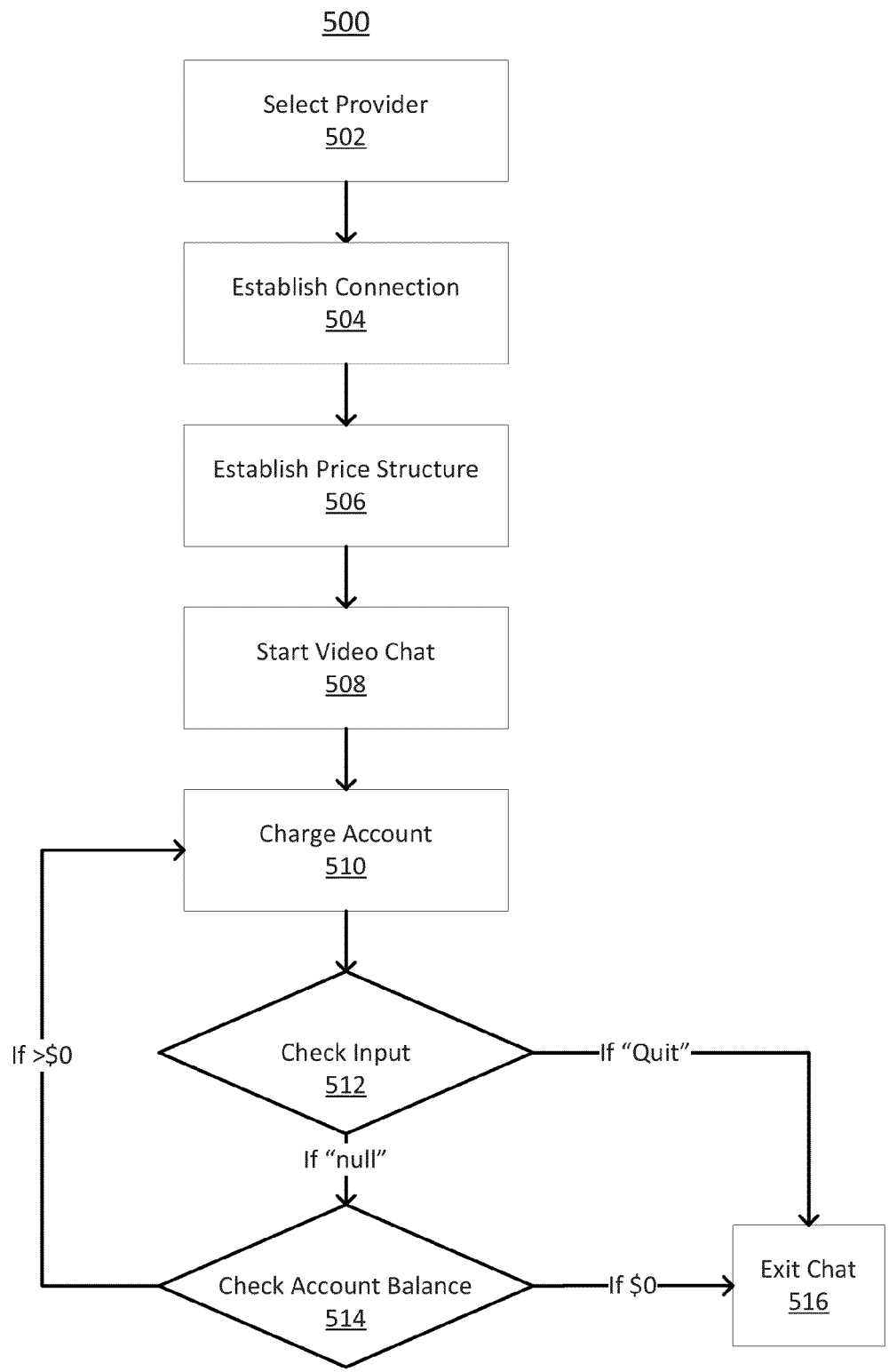
FIG. 5 is a flow diagram showing illustrative steps for establishing a connection between users in accordance with some embodiments of the present disclosure.

FIG. 5 is flow diagram 500 showing illustrative steps for establishing a connection between users in accordance with some embodiments of the present disclosure. In step 502, the interaction application may receive input indicating a selection of a provider. The interaction application may, for example, receive input as described in flow diagram 400 of FIG. 4. In step 504, the interaction application may establish a connection between the consumer and the provider. The connection may include, for example, a video chat connection. In some embodiments, the video chat connection may include communication of real time video, real time audio, prerecorded video, prerecorded audio, collaboratively edited documents, previously prepared documents, a shared viewing screen or screenshot, text communication, any other suitable communication, or any combination thereof. In some embodiments, the application may allow for a document or other information to be communicated before, during, or after an interaction. In some embodiments, video chat and/or other communications may be established using elements within the interaction application, using elements of an external program, using any other suitable technique, or any combination thereof. In step 506, the interaction application may establish a price structure service offered by the provider. In some embodiments, the interaction application may have provided the price structure before establishing the connection. In some embodiments, the interaction application may allow the price structure to be negotiated or altered. In some embodiments, the interaction application may receive a proposed price structure from the consumer, the provider, or both, and may provide that proposal to the other party for approval. The interaction application may receive approval by receiving an input such as a click or other input, or may receive a counter-offer for further negotiation. In some embodiments, the price structure may be preset by the interaction application. In step 508, the interaction application may begin the video chat session. In some embodiments, the interaction application may begin the video chat session before establishing the price structure so that a price can be negotiated using the video chat session. In step 510, the account linked with the consumer may be charged for the chat session. In step 512, the interaction application may check to see if any inputs have been received from a user (i.e., consumer or provider). If in step 510, the interaction application receives a "Quit" command from a user, it may go to step 516 and exit the chat session. Exiting the chat session may include charging the linked account for services provided up to exiting the chat. If in step 512, the interaction application does not receive an input (i.e., "null" input), then it may continue to step 514. In step 514, the interaction application may check the account balance of the consumer to confirm that there are sufficient funds to continue the chat session based on the price structure established in step 516. If the balance is below a certain threshold (e.g., $0) the interaction application may go to step 516 and exit the chat. In some embodiments, the interaction application may provide the user with the opportunity to add funds to their account and continue the chat session. In some embodiments, the threshold may be a negative amount, such that the interaction application may record a debt to the users account. If in step 514, the interaction application determines that there are sufficient funds in the user account, it may go to step 510 and charge the account for an amount based on the price structure established in step 506. In some embodiments, the interaction application may provide a user with a review or feedback page following exiting the chat in step 516.

Figure 6:
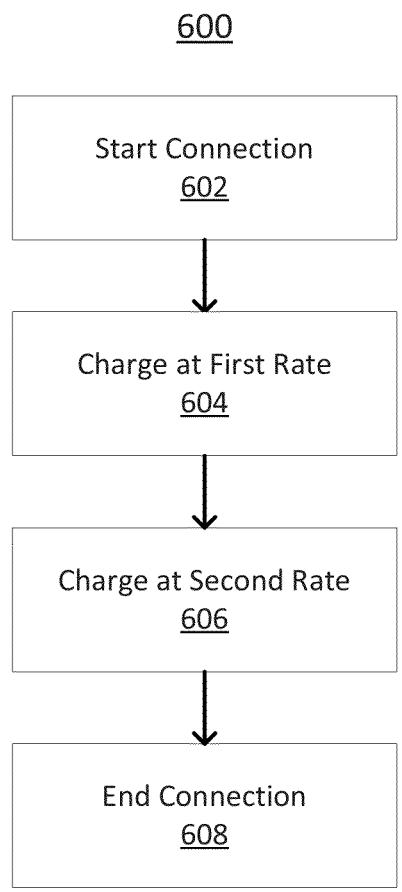
FIG. 6 is a flow diagram showing illustrative steps for billing in accordance with some embodiments of the present disclosure.

FIG. 6 is flow diagram 600 showing illustrative steps for billing in accordance with some embodiments of the present disclosure.

In step 602, the interaction application may start a chat session, for example, as illustrated in FIG. 4 and FIG. 5. A price structure may be established, for example, as described in step 506 of FIG. 5. In step 604, the interaction application may charge a first rate to the consumer, provider, or both. The interaction application may charge the user consumer a certain amount of currency per unit time (e.g., $1 per minute). In some embodiments, the interaction application may include a phase-in period with an altered price structure. For example, the first two minutes of a chat connection may be free, so that the consumer may decide if the provider is offering the services they desire. In the embodiment illustrated in flow diagram 500, a phase-in period would determine the value of the first rate in step 604. Any suitable pricing scheme for the phase in may be used. For example, an initial time period may be free of charge. In another example, an initial time period may only be charged if the chat exceeds a certain total length. In another example, a lower price may be charged for the initial time period. In step 606, a second rate may be charged to the user. The second rate may be higher or lower than the first rate. In step 608, the connection may end. The interaction application may charge other fees to the consumer or the provider after ending the session (e.g., a commission from the provider, a flat rate to the consumer).

In some embodiments, the interaction application may use a variable pricing scale that depends on the length of the service provided. For example, a plumber may charge $10 for the first minute of service, $2 per minute for the second through tenth minute of service provided, and $1 per minute for the eleventh minute and onward. In another example, a foreign language tutor may price lessons in a flat-rate package form, such as $50 for one lesson, $200 for 5 lessons or $500 for 15 lessons. In this embodiment, the interaction application may charge the consumer before establishing the connection in step 602. In some embodiments, the consumer may search for services based at least in part by price. In some embodiments, the interaction application may allow the consumer to offer or negotiate a price with a provider. It will be understood that the above described pricing structures are merely exemplary and that any number of providers may use any number of any type of pricing structure. It will also be understood that any number of rates may be used.

Revenue may be generated from any suitable sources. For example, user-generated virtual services, advertisement banners, targeted promotions, and subscriptions featuring matchmaking between users who wish to associate with others with similar preferences may generate revenue to the app provider based on a commission basis, a fee basis, or both. For example, in the virtual services context, the app provider may make a percentage (e.g., 10%) of an amount being charged by the virtual services provider. Alternatively, or in addition, the app provider may charge the consumer, the virtual service provider, or both, a fixed fee or a variable fee (e.g., based on duration of video chat session). In some embodiments, the interaction application may use a virtual bank account (e.g., cash account), credit card billing (e.g., after each session, after predetermined time or money intervals), direct bank account withdrawals, generate paper or electronic monthly bills, any other suitable billing system, or any combination thereof.

The interaction application may use a proprietary, third party, or proprietary third party service to implement some revenue features. In some embodiments, the interaction application may use a third party billing service (e.g., Paypal, Bitcoin, Movile's Mozca, Google Wallet) to manage billing and payments. It will be understood that some of these services may be implemented internally by the interaction application, some may use a third party server (e.g., billing server 120 of FIG. 1), or any combination thereof. In some embodiments, the interaction application may include in-app P2P instant payments for virtual services, so money can be instantly transferred from buyer to seller, while the service provider (e.g., the app provider) earns a commission for each transaction enacted. In some embodiments, a native iOS app, a native Android, or both may also be used to at least partially implement a payments system.

In some embodiments, the interaction application may hold funds for a pending or in-process interaction. Payment from a user may be placed in an escrow account at the time of booking, at the time of starting an interaction, at any other suitable time, or any combination thereof. For example, a user may place a deposit on a session at the time of booking, and may deposit the remainder of funds following completion of the interaction. Funds may be released from the escrow account and paid to the provider at the time of booking, at the beginning of an interaction, at the end of an interaction, after a certain amount of time following an interaction, at any other suitable time, or any combination thereof. For example, funds may be held for 24 hours following an interaction to allow the interaction application administrator to resolve user disputes or problems. In another example, users may pay at the time of an interaction, while providers are paid weekly or monthly. In another example, the interaction application may withhold a penalty payment from a provider's other interactions if the provider has missed an appointment.

In some embodiments, the interaction application may allow providers to pre-record content, for example, a foreign language lesson. The interaction application may vary pricing for live as compared to pre-recorded content. For example, live video-chat foreign language lessons may cost relatively more than pre-recorded lessons. In some embodiments, the interaction application may assign metadata to pre-recorded lessons and make them searchable. Metadata for pre-recorded videos may include titles, language, subject, transcripts, any other suitable information, or any combination thereof.

In some embodiments, the interaction application may include pre-recorded videos that have been recorded during a previous live session. In some embodiments, having a video recorded for later sale or display may alter the pricing structure for that communication. In some embodiments, a provider may request that an interaction session be recorded in exchange for a discount on price of the interaction. That recorded session may be offered to other future users as pre-recorded video at another price. For example, at the beginning of an interaction session, a provider may ask if a session that would have cost $100 can be recorded for future use in exchange for a 50% cost discount. This may be useful, for example, where the content of the interaction may be useful to multiple people. Following the interaction, a link to the pre-recorded video may be displayed on the provider's profile page for view at a price lower than the live-interaction price, such as $5.

In some embodiments, the interaction application may display advertisements related to other displayed content. The interaction application may display advertisements during a video session or at any other suitable time. The interaction application may select advertisements to display based on the user's preferences, user's profile, user's history, currently displayed video, current live chat session, any other suitable information, or any combination thereof. The interaction application may display advertisements from other providers or from third party vendors. For example, the interaction application may display an advertisement during a live language tutoring session for a bookstore selling language books. In another example, the interaction application may display an advertisement for a plumbing repair service during a pre-recording video of do-it-yourself toilet repair instructions. The interaction application may also include contextual information in displaying advertisements such as time, date, and location. For example, the interaction application may display an advertisement for a local restaurant's lunch special if the time is close to 12:00 pm. In some embodiments, the interaction application may alter the price structure based on the display of advertisements.

In some embodiments, the system may allow a user to purchase credits that may be applicable towards future use of the interaction application. Credits may, for example, be sold at a volume discount, such that a user receives extra credits when a certain amount are used or purchased. For example, the interaction application may provide 110 credits for a purchase that would normally translate to 100 credits. In another example, the search system may provide 10 free credits after every 50 purchased, irrespective of the quantity purchased at any given time. In some embodiments, credits may be transferrable. For example, a user may purchase credits for another user or provide credits as an incentive for using a service. It will be understood that the aforementioned credit transactions are merely exemplary and that any suitable transactions use of a credit-based technique may be used.

In some embodiments, a user may earn credits for certain on-site and off-site activity. The credits earned may be applicable to future use on-site and off-site. In some embodiments, credits may be applicable towards on-site awards, recognition, badges, profile page enhancements, any other suitable on-site reward, or any combination thereof. In some embodiments, on-site recognitions may provide a user with discounted interaction costs, enhanced advertising of service, enhanced on-site visibility to other users, any other suitable benefits, or any combination thereof. In some embodiments, credits may be used for purchased off-site, for example, restaurant gift certificates, airline frequent flier miles, cash, any other suitable off-site reward, or any combination thereof. In another example, off-site activity, for example earning frequent flier miles or credit card purchases, may be applied towards or redeemed for on-site credits. For example, 1000 frequent flier miles may be exchanged for 10 on-site credits. In some embodiments, a user may earn credits for interacting with advertisements in the interaction application. For example, the user may earn credits for downloading an advertised smartphone app, clicking through to advertised webpages, viewing selected content, purchasing services, any other suitable interactions, or any combination thereof.

In some embodiments, the interaction application may provide service to a particular person or group at an adjusted (e.g. free) cost. This may be referred to as a "freemium" service. For example, the interaction application may provide free use of the services to members of the media to increase visibility and public awareness. In some embodiments, interactions between two sets of users may be provided free of charge. For example, interactions between expert venture capital executives and new business developers may be charged at a normal rate, while interactions between the executives and the media may be provided for free. In some embodiments, the freemium service may allow two linked users to interact with one another without charge. Linked users may include two or more users are "friends," have bookmarked one another's profiles within the interaction application, have established a connection based on an external social media application, have indicated a connection by any other suitable technique, or any combination thereof. For example, two users who are friends within the interaction application and do not want to exchange money for services may have a video interaction using the interaction application without charge.

Figure 7:
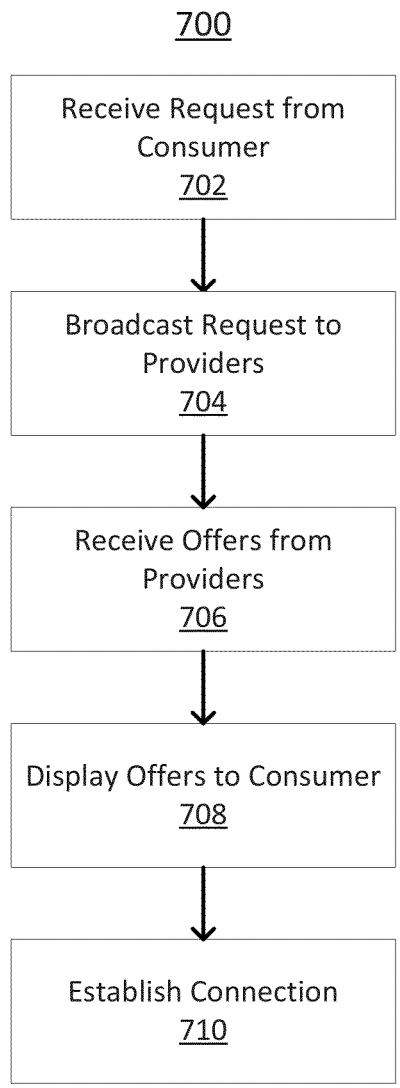
FIG. 7 is a flow diagram showing illustrative steps for broadcasting a request in accordance with some embodiments of the present disclosure.

FIG. 7 is flow diagram 700 showing illustrative steps for broadcasting a request in accordance with some embodiments of the present disclosure. In step 702, the interaction application may receive a broadcast request input. The interaction application may receive request from a consumer seeking a particular service. In step 704, the interaction application may broadcast the request to a particular group of providers. For example, a request may be broadcast to providers within a particular geographic location, providers offering a particular service, providers with particular social networking connections, providers with a particular rating, providers with any other suitable characteristics, or any combination thereof. For example, a consumer seeking a plumber may broadcast a request to all providers offering plumbing services within 10 miles. In step 706, the interaction application may receive offers from the providers in response to the broadcast request. In step 708, the interaction application may display at least one of the offers received to the consumer. The offers may be displayed, for example, in the mosaic illustrated in FIG. 3. In step 710, the interaction application may establish a connection between the consumer and a provider based on input received. In some embodiments, providers may broadcast requests to consumers, offering a service (i.e., advertising). In some embodiments, consumers may broadcast requests to other consumers seeking advice about providers. In some embodiments, providers may broadcast requests to other providers.

Figure 8:
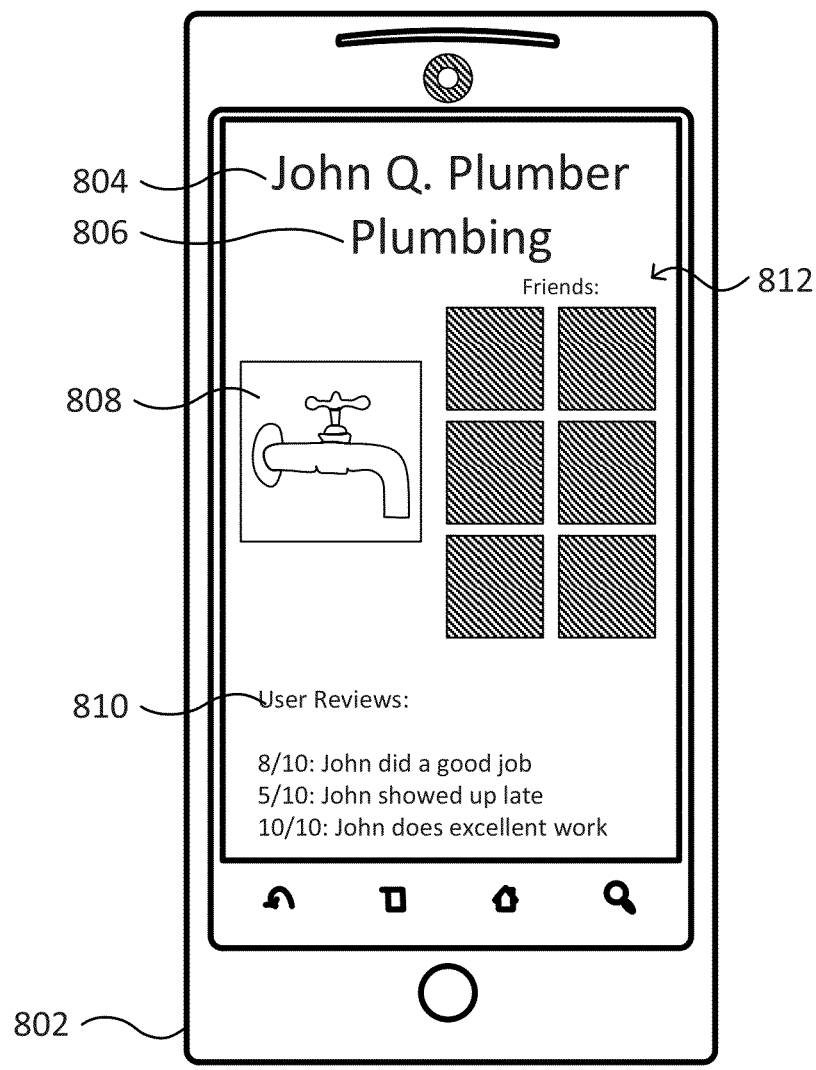
FIG. 8 shows an illustrative display screen having a user profile in accordance with some embodiments of the present disclosure.

FIG. 8 shows an illustrative display screen having a user profile in accordance with some embodiments of the present disclosure. The interaction application may display content on user device 802. User device 802 may include, for example, user device 102 of FIG. 1. The interaction application may display a user profile for a user. The user profile may include one or more names 804, one or more titles 806, one or more images 808, one or more user reviews 810, and one or more friends 812.

In some embodiments, provider, consumers, or both may be given the ability to create user profiles or any other suitable type of user-generated content (e.g., images, videos, text). For example, image 808 as illustrated in FIG. 8 shows the image of a water faucet on the user profile of a plumber. In some embodiments, image 808 may be a picture of the user associated with the user profile. User-generated content may be assigned metadata by the user (i.e., the consumer or service provider) that generated the content. For example, a provider may include an example of the service they provide in tile 806, a video review from a previous consumer, before-and-after photographs, professional licensing (e.g., certified electrician), any other suitable content, or any combination thereof. The metadata may include the type of content, the user who generated the content, the subject of the content, a rating of the content any other suitable information, or any combination thereof. User-generated content may be searchable (e.g., as described in step 408 of FIG. 4) according to any suitable criteria, including for example, by the generating user, by date, by rating, by content, by any other suitable criteria, or by any combination thereof.

As described above, the interaction application may display content imported from an external source. For example, the interaction application may import information from a social media site related to the user. In some embodiments, the user may provide permission to access and import the data. In some embodiments, the imported information may be parsed and made searchable. The interaction application may, for example, import interests, friends, pictures, movies, audio, descriptions, recommendations, ratings, skill set lists, resumes, any other suitable information, or any combination thereof.

In some embodiments, the interaction application may provide the ability for a first user to record feedback on a second user. The interaction application may display feedback, for example, in user reviews 810 of a user profile. The interaction application may record feedback from a consumer related to a provider, for example, a rating of the quality, timeliness, or value, of a service provided. The interaction application may record feedback from a provider related to a consumer, for example, the delivery of prompt payment. The interaction application may record feedback from a provider related to another provider, for example, an endorsement of services. The interaction application may record feedback from a consumer related to another consumer, for example, a personal endorsement. In some embodiments, feedback may be displayed on a user profile. In some embodiments, feedback may be used to rank search results. In some embodiments, feedback may be recorded using a star system (e.g., 1 to 5 stars), a number system (e.g., 0 to 10), by any other suitable rating method, or any combination thereof.

The interaction application may provide the capability to establish social media connections. The interaction application may display the connections of a user in the friends 812 of a user profile. In some embodiments, users may form social networks with one another. For example, if a consumer likes a particular provider, the consumer or service provider may add the other to his or her network. Networks may be defined according to, for example, types of services offered. In some embodiments, the consumer or provider may bookmark another consumer or service provider. In some embodiments, the interaction application may create a profile page for a user. The interaction application may allow the users to create connection with other users (i.e., "friends") on the network.

In some embodiments, the interaction application may provide the ability for users with social media connections to refer users to other users. In some embodiments, one user may refer another user to a particular provider. For example, a user's friend may be looking for a real estate agent. The user may refer their friend to a real estate agent on the interaction application. In another example, a provider may refer a user to a different provider. For example, a user may ask a question of a provider that the provider can't respond to completely. The provider may refer the user to one of the provider's friends who has more expertise in that particular area. In some embodiments, a user may broadcast a request to their friends seeking a particular expertise. In some embodiments, a traditional search may be combined with referrals. In some embodiments, results of a search may include other users who have used a particular provider, such that the user searching can contact the previous user of that provider for advice or a personal review. In some embodiments, referrals may be incentivized through credits (as described above), with cash incentives, with adjusted pricing within the interaction application, with badges, with any other suitable incentive, or any combination thereof. In some embodiments, referrals may include friends, social media content, location based services, other suitable information, or any combination thereof. In some embodiments, the interaction application may suggest to a user that they refer a particular provider to another user based on interests, searching, prior use of the interaction application, a request, any other suitable reason, or any combination thereof.

Figure 9:
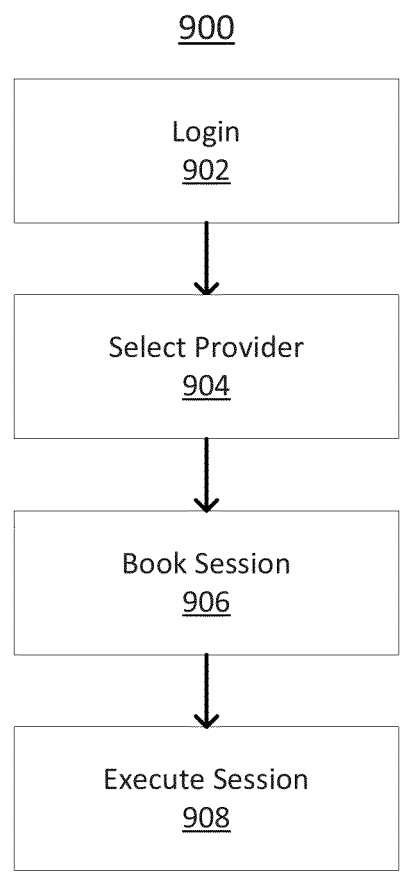
FIG. 9 is a flow diagram showing illustrative steps for booking an executing an interaction in accordance with some embodiments of the present disclosure.

FIG. 9 is flow diagram 900 showing illustrative steps for booking and executing an interaction in accordance with some embodiments of the present disclosure.

In step 902, the interaction application may receive login information from a user. In some embodiments, the interaction application may use a federated third party login process. For example, the interaction application may use a Facebook login, Google login, iTunes login, OpenID login, single-sign-on system login, any other suitable login, or any combination thereof. In some embodiments, the interaction application may use an internal login process, for example, a username and password.

In step 904, the interaction application may receive a selection of a provider from a user. As described above, the user may search for providers based on friend links, mutual friends, interests, knowledge areas, geographic location, reviews, recommendations, any other suitable parameters, or any combination thereof. The list may be, for example, displayed as a mosaic as described above. In some embodiments, the provider list may be refined multiple times. In some embodiments, the interaction application may allow the user to contact the interaction application administrators or other managers in the event, for example, they cannot find a desired service or service provider.

In step 906, the interaction application may receive a request to book a session from a user. The booking request may include a particular time and date of a requested session. In some embodiments, a provider may provide availability information, such that a user can select a mutually available time. For example, a provider may indicate availability only on weekends. In some embodiments, the interaction application may maintain availability information based on bookings with other users, such that a provider and/or a user does not book two sessions for the same time.

In some embodiments, the interaction application may notify the provider, the user, or both, following a booking request. Notifications may include email, push notifications, messages provided within the interaction application, emails, chat messages, text messages, voice calls, video chats, any other suitable notification, or any combination thereof. In some embodiments, the notification email may include links to the booking on in the interaction application, may include the ability to cancel or modify a scheduled interaction, may include the ability to contact the other user or provider ahead of a scheduled interaction, may provide any other suitable process, or any combination thereof.

In some embodiments, the interaction application may request payment information from a user following booking. It will be understood that the particular sequence of events is merely exemplary. For example, the interaction application may request payment information before sending a booking notification, before receiving a booking request, before executing a session, after ending a session, in any other suitable sequence, or any combination thereof. In some embodiments, payment information may be stored in the interaction application or on a third party payment site such that, for example, repeat customers can reuse payment information automatically. In some embodiments, the system may reconfirm and/or reauthorize the use of previously stored payment information.

In some embodiments, the notification from an interaction application of a booked session may include content capable of generating a calendar entry related to the session. For example, the delivered notification may automatically generate a calendar entry or allow a user to export a calendar entry at the appropriate time and date in an online calendar such as Google Calendars, an offline calendar such as Outlook, may generate a reminder specifically formatted for printing, may generate any other suitable calendar entry, or any combination thereof.

In some embodiments, an interaction event may be scheduled on a third party social media. For example, a Facebook Event may be scheduled on Facebook and a link to a scheduled session on the interaction application may be provided on the social media site to friends of the event creator. In this way, for example, a scheduled seminar or presentation may be publicized through social media and then provided through the interaction application.

In step 908, the interaction application may execute a session. Executing a session may include starting a video chat or other interaction, conducting the interaction, and ending the interaction. In some embodiments, the starting the interaction may include the interaction application receiving from the user, the provider, or both, input initiating a communication. For example, at the time booked in step 906, the user may open the interaction application and start a chat session. In some embodiments, reminders may be sent to the user by push notification, email, text message, chat message, a notification within the application, any other suitable notification, or any combination thereof. In some embodiments, the interaction application may automatically launch when a booked session begins or is about to begin. In some embodiments, the interaction application may automatically launch a video chat application at the time of a session.

In some embodiments, the interaction application may allow a user to contact a provider at any time following booking a session. In some embodiments, the interaction application may allow a user to contact a provider within a particular time window. For example, the interaction application may allow a user to contact a provider within a 12 hour window prior to a session. In another example, the interaction application may allow the user to contact a provider 6 hours before and 6 hours after a session. This may, for example, allow the interaction application to reestablish a session that is broken due to a network interruption without generating or requiring a new booking.

In some embodiments, the interaction application may provide the contact information of a provider to a user. In some embodiments, the interaction application may allow a user to contact a provider but may not provide specific contact information, such that the user will not be able to contact the provider outside of the interaction application. This may, for example, protect the privacy of the provider. This may also, for example, prevent users and providers from circumventing the interaction application and its associated costs.

In some embodiments, booking and/or executing the session may include establishing a time or cost limit or target for the interaction. For example, the provider may establish a 30 minute maximum. In another example, the user may establish at $50 maximum cost. Limits may be established for each interaction, established as part of a user or provider profile, modified for an interaction, established in any other suitable technique, or any combination thereof. In some embodiments, when a pre-established limit is reached in the course of an interaction, the interaction application may interrupt the interaction. For example, the interaction may automatically end. In another example, the interaction application may provide a notification that the available time has ended or is about to end. The interaction application may allow a user and/or provider to extend a session. In some embodiments, extending a session may require the mutual agreement of both the user and provider. For example, a pop-up notification provided to both the user and provider may require an affirmative response by both to extend the session.

In some embodiments, executing a session (and other actions within the interaction application) may generate statistics and other analytical information that may be useful for providers, users, administrators, any other suitable entity, or any combination thereof. Analytics may be generated automatically (e.g., a timer) or manually (e.g., a feedback form).

Analytics may include front end analytics that are displayed to users and providers. For example, the interaction application may provide usage statistics based on previous interactions of a provider to a potential user. These statistics may include average ratings, interaction costs, interaction durations, the frequency of interactions, the frequency and amplitude of repeat users, referral frequency, any other suitable information, or any combination thereof. In some embodiments, the displayed information may be modified or selected based on the type of provider. For example, a user may expect a pediatrician to have a high number of repeat users, since children tend to repeatedly need care. In another example, a user may expect a high referral rate associated with a house painter, since that is a service used less frequently by any particular user.

Analytics may include back end analytics that are displayed only to administrators. The back end analytics may be useful, for example, for improving service, generating provider suggestions to users, identifying malicious or ill-behaving providers and users, for any other suitable purpose, or any combination thereof. For example, back end analytics may determine that a provider has a high number of bookings that are cancelled or not successfully initiated. The interaction application may determine that the provider is unreliable and should not be recommended to users. In another example, back end analytics may identify that a provider's interactions last a very short time, suggesting that the provider is using the interaction application to establish clients that are then contacted outside the system, thus avoiding payment.

The foregoing is merely illustrative of the principles of this disclosure and various modifications may be made by those skilled in the art without departing from the scope of this disclosure. The above described embodiments are presented for purposes of illustration and not of limitation. The present disclosure also may take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed:

1. A method for providing interaction between a consumer and a service provider, the method comprising:
   receiving, using one or more processors, from a first user device associated with the consumer, one or more criteria for selecting the service provider;
   providing, using one or more processors, to the first user device associated with the consumer, a collection of service providers based at least in part on the criteria, wherein providing the collection of service providers comprises providing information associated with a social networking profile, wherein at least one of the service providers is associated with an unactivated user account, and wherein the information associated with a social networking profile comprises information retrieved from a third party database;
   receiving, using one or more processors, from the first user device associated with the consumer, a selection identifying a service provider from the collection of service providers;
   establishing, using one or more processors, a video connection between the first user device associated with the consumer and a second user device associated the service provider; and
   maintaining, using one or more processors, a balance amount at least a part of which is to be paid to the service provider.

2. The method of claim 1, wherein establishing the video connection comprises establishing 2-way video communication, and wherein the user device comprises a front facing camera.

3. The method of claim 1, wherein the receiving the one or more criteria comprises receiving geographic information.

4. The method of claim 1, wherein receiving the one or more criteria comprises receiving contextual information associated with at least one of the service providers of the collection of service providers.

5. The method of claim 1, wherein establishing the video connection comprises providing pre-recorded video to the consumer.

6. The method of claim 1, wherein providing a collection of service provides comprises providing a mosaic of images associated with the collection of service providers.

7. A system for providing interaction between a consumer and a service provider, the system comprising:
   one or more computers configured to:
      receive from a first user device associated with the consumer, one or more criteria for selecting the service provider;
      provide to the first user device associated with the consumer, a collection of service providers and information associated with a social networking profile based at least in part on the criteria, wherein at least one of the service providers is associated with an unactivated user account, and wherein the information associated with a social networking profile comprises information retrieved from a third party database;
      receive from the first user device associated with the consumer, a selection identifying a service provider from the collection of service providers;
      establish a video connection between the first user device associated with the consumer and a second user device associated the service provider; and
      maintain a balance amount at least a part of which is to be paid to the service provider.

8. The system of claim 7, wherein the processing equipment is further configured to establish 2-way video communication, and wherein the user device comprises a front facing camera.

9. The system of claim 7, wherein the processing equipment is further configured to receive geographic information.

10. The system of claim 7, wherein the processing equipment is further configured to receive contextual information associated with at least one of the service providers of the collection of service providers.

11. The system of claim 7, wherein the processing equipment is further configured to provide pre-recorded video to the consumer.

12. The system of claim 7, wherein the processing equipment is further configured to provide a mosaic of images associated with the collection of service providers.

13. A non-transitory computer-readable medium for providing interactions between a consumer and a service provider, having instructions recorded thereon for:
   receiving, using one or more processors, from a first user device associated with the consumer, one or more criteria for selecting the service provider;
   providing, using one or more processors, to the first user device associated with the consumer, a collection of service providers based at least in part on the criteria, wherein providing the collection of service providers comprises providing information associated with a social networking profile, wherein at least one of the service providers is associated with an unactivated user account, and wherein the information associated with a social networking profile comprises information retrieved from a third party database;
   receiving, using one or more processors, from the first user device associated with the consumer, a selection identifying a service provider from the collection of service providers;

establishing, using one or more processors, a video connection between the first user device associated with the consumer and a second user device associated the service provider; and maintaining, using one or more processors, a balance amount at least a part of which is to be paid to the service provider.

14. The non-transitory computer-readable medium of claim 13, wherein establishing the video connection comprises establishing 2-way video communication, and wherein the user device comprises a front facing camera.

15. The non-transitory computer-readable medium of claim 13, wherein the receiving the one or more criteria comprises receiving geographic information.

16. The non-transitory computer-readable medium of claim 13, wherein receiving the one or more criteria comprises receiving contextual information associated with at least one of the service providers of the collection of service providers.

17. The non-transitory computer-readable medium of claim 13, wherein establishing the video connection comprises providing pre-recorded video to the consumer.

* * * * *